United States Patent [19]

Populin et al.

[11] 3,907,135
[45] Sept. 23, 1975

[54] APPARATUS RELATING TO THE ORIENTATION OF ELONGATED ELEMENTS

[76] Inventors: Peter Populin; Louis Populin, both of Groper Creek Rd.; Guiseppe Scalia, Woods Rd., all of Home Hill, Australia, 4806

[22] Filed: Feb. 28, 1973

[21] Appl. No.: 336,441

[30] Foreign Application Priority Data
Oct. 3, 1972   Australia............................. 8243/72
Jan. 15, 1973   Australia............................. 1900/73

[52] U.S. Cl. ................... 214/83.36; 111/3; 198/55; 214/508; 221/217; 222/371
[51] Int. Cl.²............................................ A01C 7/00
[58] Field of Search ............ 214/83.36, 508; 111/2, 111/3; 198/55; 221/217, 218; 222/371

[56] References Cited
UNITED STATES PATENTS

| | | | |
|---|---|---|---|
| 602,776 | 4/1898 | Schmitt........................ | 214/83.36 X |
| 1,571,364 | 2/1926 | Bates................................ | 198/55 X |
| 2,945,684 | 7/1960 | Soldini........................ | 214/83.36 X |
| 3,325,060 | 6/1967 | Rehder............................. | 222/371 |
| 3,348,714 | 10/1967 | Ash.................................... | 214/508 |

FOREIGN PATENTS OR APPLICATIONS

| | | | |
|---|---|---|---|
| 2,129 | 6/1875 | United Kingdom................. | 222/218 |
| 279,746 | 10/1914 | Germany........................... | 222/321 |

*Primary Examiner*—Robert J. Spar
*Assistant Examiner*—George F. Abraham
*Attorney, Agent, or Firm*—Hill, Gross, Simpson, Van Santen, Steadman, Chiara & Simpson

[57] ABSTRACT

Elongated elements such as sugar cane billets or setts are conveyed from a randomly orientated mass in a storage bin to a receiving station so as to be received with the longitudinal direction of each element extending in a predetermined direction. One embodiment is an automatic sugar cane planter having a bin containing short billets cut by a chopper harvester, an endless conveyor having horizontal flights extending upwardly and outwardly from the bin, and a casing enclosing the downward return run of the conveyor so as to retain the billets which fall from each flight to be supported on the back of the preceding flight. A flapper mechanism in association with the upward run of the conveyor pivotally moves to eject upstanding billets back into the bin, while a lip on the edge of the back of each flight retains only a single billet thereon, any surplus billet rolling out through an aperture in the casing to be guided by a chute back to the return run. The billets lowered in sequence to the bottom of the return run are dropped to be planted by a conventional planter.

5 Claims, 9 Drawing Figures

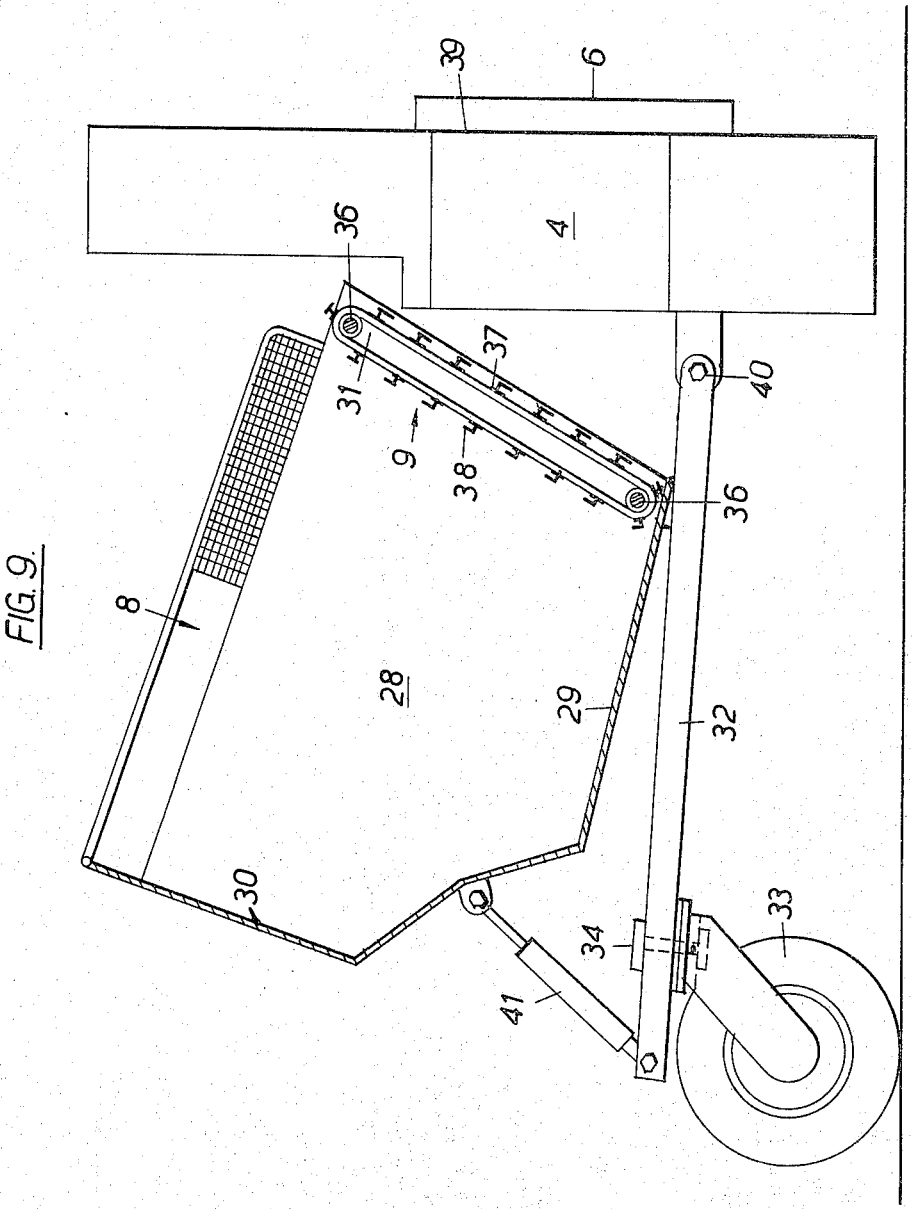

APPARATUS RELATING TO THE ORIENTATION OF ELONGATED ELEMENTS

The present invention relates to handling elongated elements such as sugar cane billets which are to be advanced from a source thereof to a downstream station. The invention in one embodiment can be especially applicable to an arrangement for planting sugar cane billets wherein the billets are advanced one at a time from a storage bin to a planter mechanism.

In this specification, the word "billet" is used to refer to a short length of green sugar cane, typically having two or three "eyes" and being 40 cm. long, the billet having been cut from green cane which is to be used for planting purposes. These billets are also known in the planting purposes. These billets are also known in the art as "setts".

In the past, cane has been cut and stripped by hand before being fed manually as a long stick into a planting machine which is mounted on a tractor. The planting machine receives the cane and chops it into short billets which are then laid in a trench and covered by earth as the tractor moves across a previously ploughed field. It will be apparent that this planting operation is relatively slow, requires a large amount of manpower and is accordingly extremely expensive. These problems have long been recognised but hitherto the present applicants are unaware of any workable automatic planting machine having been designed.

The present invention, however, can at least in one embodiment permit a great reduction in the amount of labour required for planting sugar cane and accordingly a more economic operation is possible. However, the invention can be equally useful in other operations requiring elongated elements to be oriented in a supply process.

According to one aspect of the present invention, there is provided apparatus comprising means for containing a supply of elongated elements, and conveyor means for conveying the elongated elements to a receiving station such that a sequence of elongated elements are received, the conveyor means having at least one displaceable conveyor element which in a normal operating position is displaceable upwardly through said container means so as to take up and convey an elongated element from said supply towards the receiving station, means being provided for positioning said conveyed elongated element with its longitudinal direction extending in a predetermined direction before the elongated element reaches the receiving station.

Hereinafter, the elongated elements will be referred to as billets for convenience, but it is to be understood that the word billet is used in a broad sense to cover all elongated elements which are referred to above.

Preferably, the conveyor means has an endless moveable member on which a plurality of conveyor elements are mounted, each providing a trough-like recess for receiving billets. In a working position, the trough-like recesses extend horizontally so that the billets fall into the recesses and are thus oriented. The conveyor has its forward run extending upwardly and its return run extending downwardly outside the container to supply the billets, for example, to a conventional sugar cane planter head.

In a preferred and important embodiment, the conveyor extends at angle to the vertical away from the container so as to form an overhang with the return run on the lower side. A casing encloses the return run to ensure that the billets fall at the top of the return rung onto the back of the preceding conveyor element, so as to be lowered to the bottom of the return rung for delivery in the correct orientation to the receiving station.

Preferably, an arrangement is provided for causing only a single billet to be lowered on the back of each conveyor element (which can also be referred to as a "flight") to the receiving station. This arrangement can be provided by an aperture in the casing extending across the width of a conveyor element, each conveyor element having a lip on the edge of its back surface which is upturned during motion along the return run of the conveyor such that only a single billet is retained and any surplus billet rolls off through the aperture to be returned via a chute to the container means.

Furthermore, an arrangement is preferably provided in association with the forward run for ejecting any upstanding billet so that the billet falls back into the container. A pivotal flap may provide this arrangement.

According to another aspect of the invention, there is provided apparatus for supplying sugar cane billets to a planting machine, the apparatus comprising walls and a floor defining a billet-receiving bin, wheel means on which the bin can be moved, and billet supply means having at least one operating element displaceably mounted for movement through said bin so as to pass through a mass of billets stored in the bin and to take up some of the billets and convey these billets to a discharge point which is elevated relative to the floor of the bin so as to discharge these billets to the planting machine.

Preferably, the apparatus is arranged to be towed as a trailer behind the planting machine, and the front wall of the bin has the billet supply means located adjacent thereto such that the operating element is displaceably mounted so as to move up the front wall to discharge the billets as the top of the front wall so that the billets fall into a receiving zone of the planting machine.

For the purpose of facilitating supply of the billets to the billet supply means, the floor of the bin is preferably disposed at an angle to the horizontal so that as the bin approaches an empty state the billets slide down the floor towards the billet supply means. In a preferred embodiment of the invention, the floor is displaceably mounted and controlled by actuating means for the purpose of displacing the floor to the desired angle of inclination to facilitate the supply of billets to the billet supply means.

An embodiment of the invention will now be described, by way of example, with reference to the accompanying drawings, of which:

FIG. 9 is a schematic side elevation showing the trailer bin of FIG. 1 for connection to the planting head of FIGS. 2 – 8.

Figure 1:
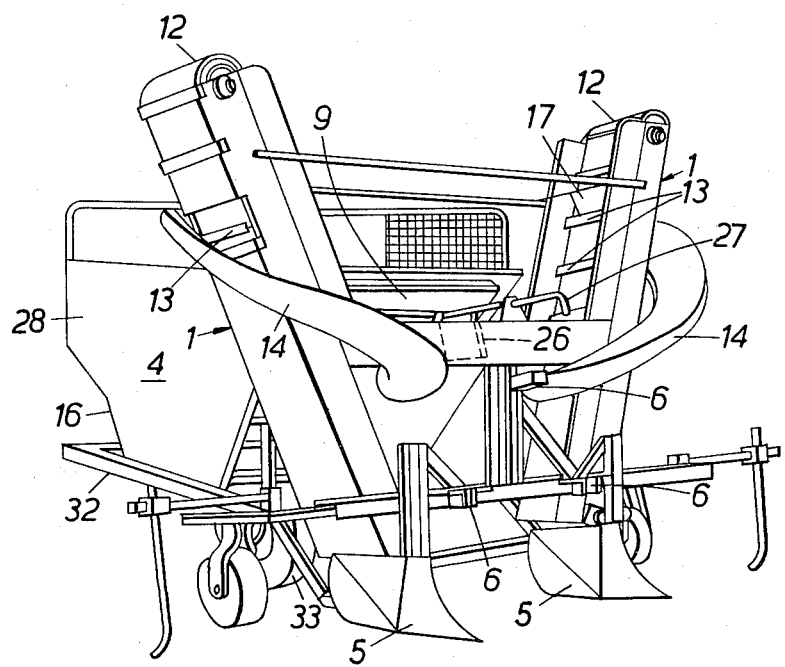
FIG. 1 is a perspective view from the front of an automatic sugar cane planting apparatus.

The sugar cane planting apparatus of FIG. 1 is arranged to plant simultaneously two rows of sugar cane supplied in the form of billets approximately 40 cm. long and typically having two or three eyes from which germination can occur. The billets are cut by a chopper harvester from green cane and delivered by truck to the planting site.

The planting apparatus comprises a pair of conveyors in the form of elevators 1 having an upward forward run 2 and a downward return run 3 for advancing billets from respective containers in the form of storage bins 4 to a receiving station in the form of a planting device 5 at the bottom of the return run 3. The planting device receives the billets with the axis of each billet extending along the direction of movement of the apparatus which is coupled via a three-point linkage 6 to a tractor. Each planting device has a nose 7 for forming a furrow in pre-ploughed soil, a zone in which the billets are dropped end-to-end (or if desired in overlapping relationship) into the furrow, and a covering device for covering the billets with soil.

A trailer supply bin 8, capable of holding two tons of billet is drawn behind the planter head described above, the bin 8 having tiltable floor along which billets slide to a conveyor for advancing the billets to the storage bins 4 when desired. The trailer supply bin 8 is described below in more detail.

The elevators 1 are mechanically driven through a chain drive arrangement including a main drive chain 9 which is driven by a sprocket wheel (not shown) attached concentrically to the outside of a main wheel of the tractor. The arrangement can be set to the desired timid relationship so that the rate at which the billets are layed, for a constant tractor speed, can be varied. The conveyor and floor lifting device of the trailer supply bin 8 is driven hydraulically by a pump powered by a power take-off of the tractor. The tractor driver can activate these controls when desired.

FIG. 1 also shows an ejection device 10 associated with the upward run 2 of the elevator for ejecting, upstanding billets back into the storage bin 4, and a discharge arrangement including an aperture 11 in a casing 12 for the return run 3 for discharging any billet in excess of the single billet intended to be lowered on the "back" of each conveyor element or bucket 13 of the elevator. Any discharged billet is directed by a chute 14, which follows a helicalpath around the elevator, back into the storage bin 4.

The apparatus will now be described in more detail with reference to FIGS. 2–9.

Figure 2:
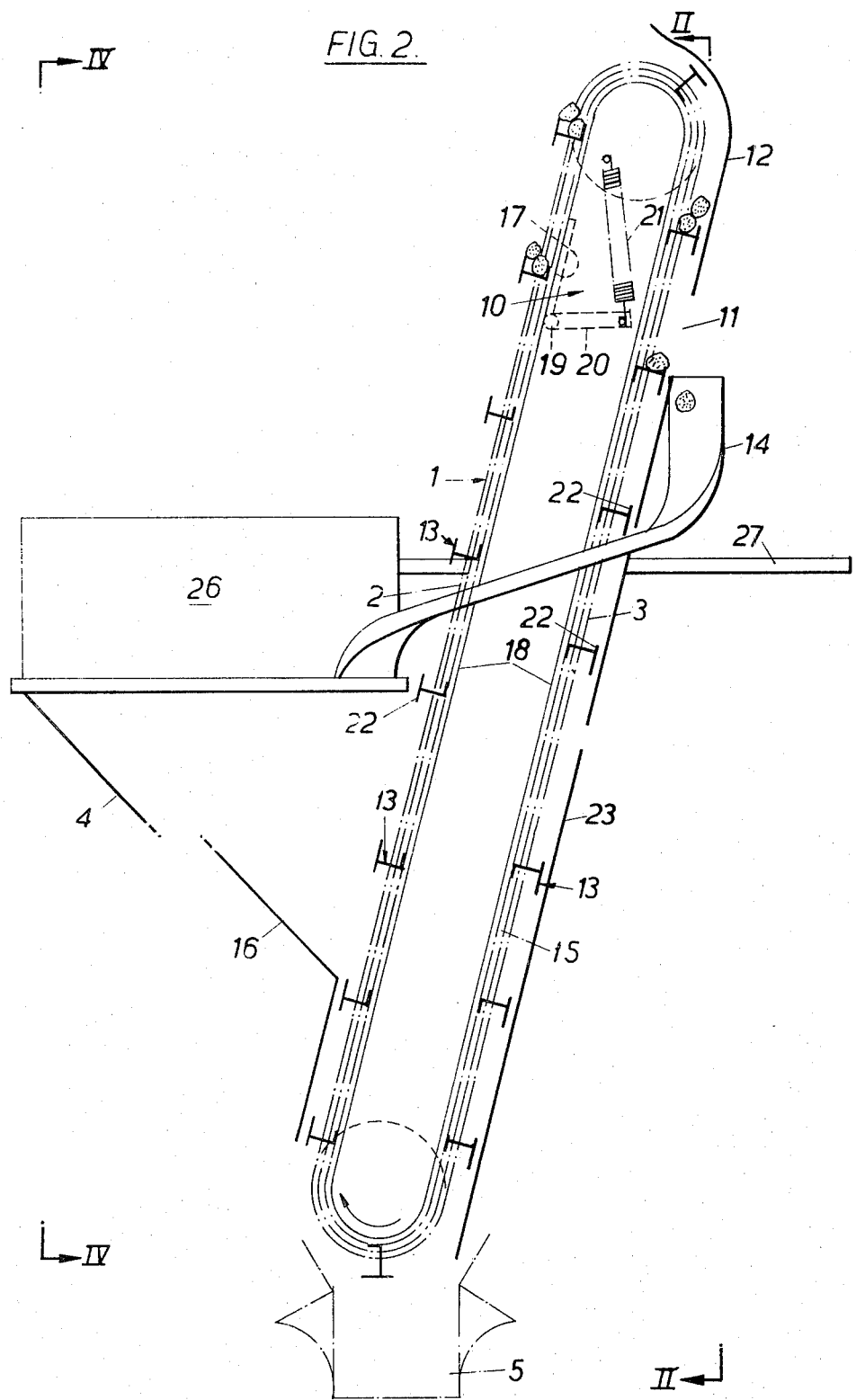
FIG. 2 is a schematic sectional side elevation of the planting head of the apparatus of FIG. 1 taken along the line II—II of FIG. 3.
Figure 3:
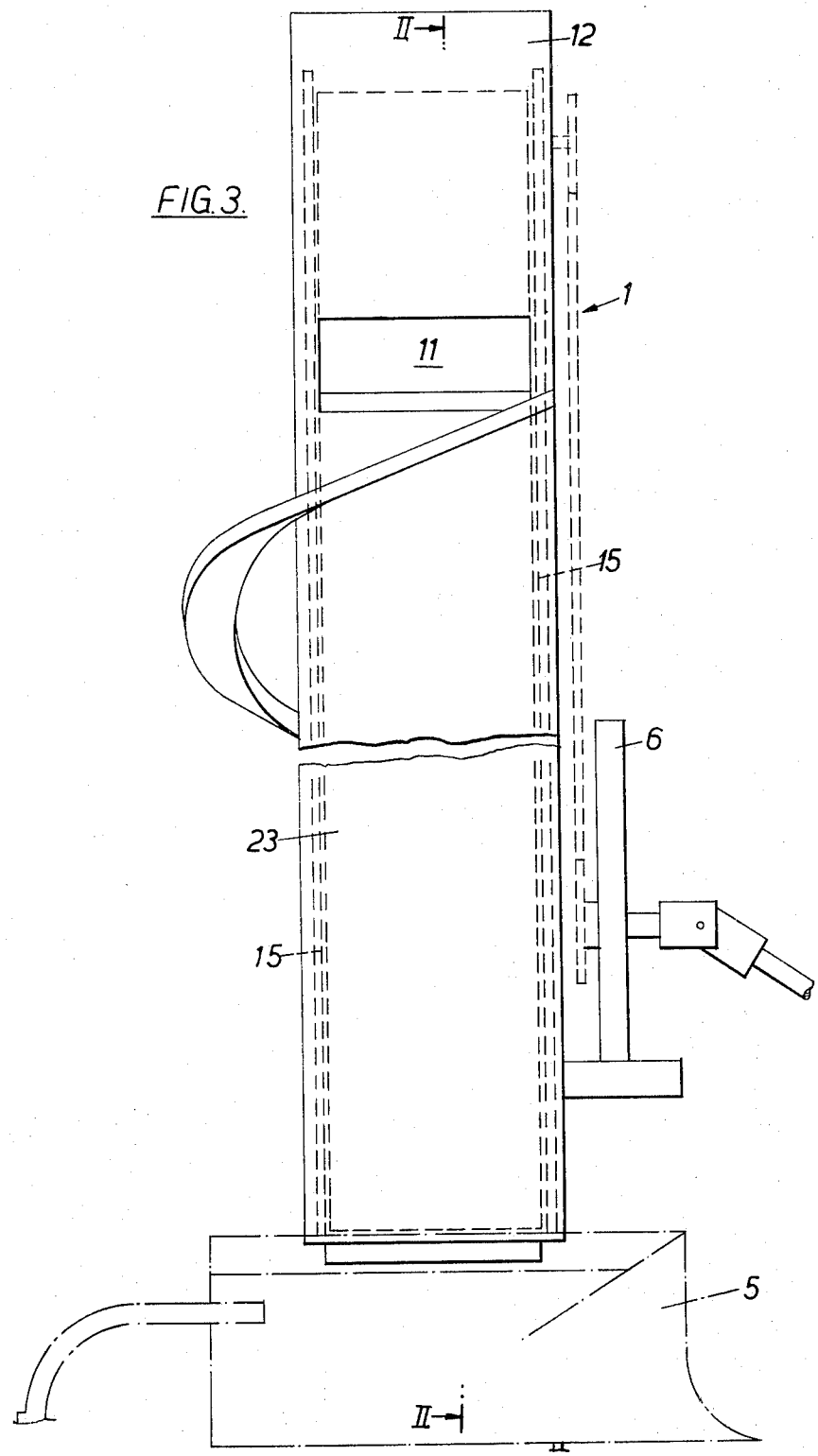
FIG. 3 is a front elevation taken along the line III—III of FIG. 2.
Figure 4:
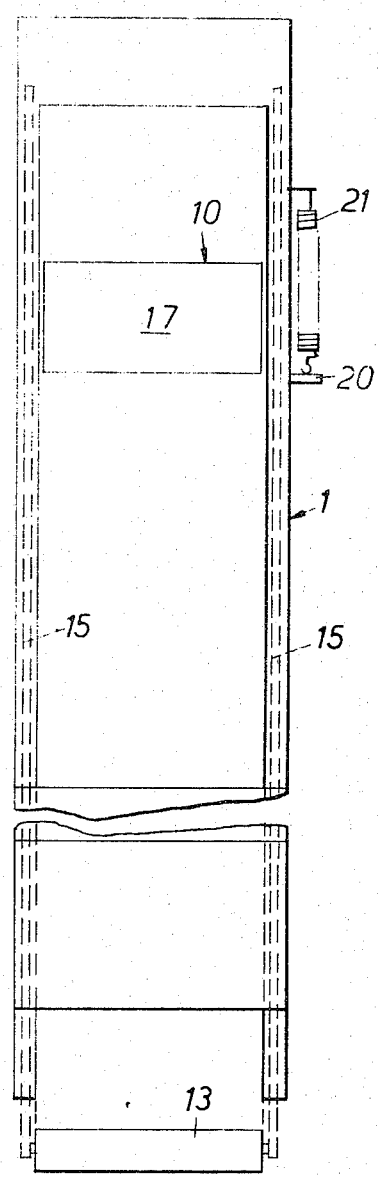
FIG. 4 is an elevation taken along the line IV—IV of FIG. 2.

Referring to FIGS. 2–4, an elevator 1 is shown in more detail.

The elevator 1 extends upwardly at an angle of about 75° to the horizontal, and runs in a clockwise direction as shown in FIG. 1. The elevator has a series of horizontal buckets 13 mounted between a pair of parallel chains 15 which are set at the sides of the elevator, and move the buckets upwards through the storage bin 4 to be loaded with billets.

Figure 8:
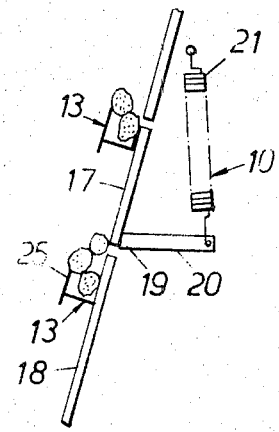
FIG. 8 is a view of the hammer mechanism in a depressed position.
Figure 7:
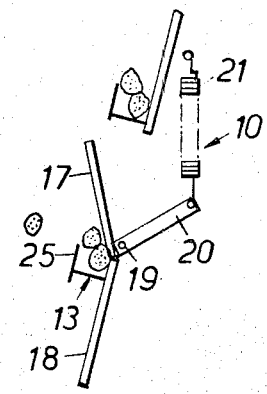
FIG. 7 is a detailed side view of the hammer mechanism in a released position.
Figure 5:
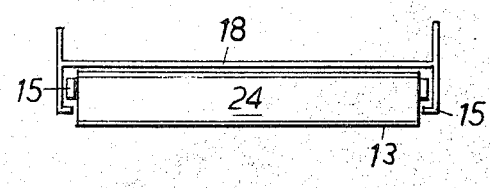
FIG. 5 is an enlarged view of a bucket of the apparatus.

The storage bin 4 is wedge-shaped and has a ramp-like side 16 down which billets roll so as to be scooped up by the buckets as they pass through the storage bin. The buckets will typically pick up several billets some of which may be upstanding and some may immediately fall off back into the bin 4. However, it is necessary to control carefully the orientation of the billets and for this purpose an ejection device 10 is provided. As shown more clearly in FIGS. 7 and 8, the device 10 comprises a pivotal flap 17 which in the depressed position shown in FIGS. 2 and 8 fits flush with an inner lining sheet 18, which extends around the inside of both conveyor runs to prevent billets falling into the interior of the elevator. The flap 17 is pivotally mounted at its lower edge about a cross-shaft 19 and is fixed to an operating lever 20, the free end of which is attached to a helical extension spring 21 which biases the flap and lever in an anticlockwise direction as shown in FIGS. 2, 7 and 8 so that the flap normally extends outwardly from the conveyor between the chains 15. It will be seen from the drawings that the height of the flap 17 is a little less than the space between adjacent buckets 13.

Thus, as a bucket passes over the flap 17, the flap is released and under the influence of the spring 21 pivots outwardly and knocks from the next succeeding bucket any upstanding billets. In addition, if an excess number of billets are loaded onto the bucket, some may also be knocked off so as to fall back into the storage bin 4.

Since each bucket may well contain two or more billets, it is necessary for efficient planting to ensure that only a single billet at a time is fed to the planter head 5. For this purpose, the downward run 3 is inclined backwardly and co-operates with the casing 12 which is in a spaced confronting relationship with the downward run. As the buckets move over the top of the conveyors, the billet or billets therein fall under gravity and land on the back of the preceding bucket so that one of the billets is correctly supported in a horizontal attitude, a small lip 22 retaining this billet. As indicated in FIG. 1, an excess billet rests against the casing 12 until the bucket descends to the aperture 11 in the casing at which point the excess billet falls into the chute 14 for return to the bin 4. In the lower portion 23 of the casing, spraying devices can be provided for treating the billets as desired, before the billet is dropped into the planting device 5.

Figure 6:
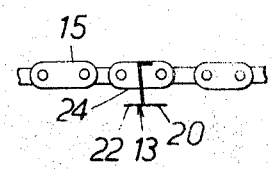
FIG. 6 is a side elevational view showing the bucket of FIG. 5.

As shown more clearly in FIG. 6, each bucket 13 has a supporting web 24 extending perpendicularly from the conveyor chains 15 and bolted thereto. At its free edge, the web 24 has a flange extending in both directions parallel to the conveyor to provide a pair of lips, the lip 25 on the leading side of the bucket being a substantially higher so as to retain several billets but the lip 22 for the back of the billet only acting to retain a single billet over the return run 3.

The apparatus of FIG. 1 is mounted on a tractor by a three-point linkage which is hydraulically operated so that the vertical position of the planting device can be readily adjusted, only one man required for the planting operation. As indicated, each storage bin 4 is relatively small so as to facilitate operation of elevators 1. However, to permit uninterrupted planting, the tractor supply bin 8, shown in detail in FIG. 9, is towed behind the planting machine. However, since uniform feed rate from the bin 8 to the bins 4, a pivotal sheet 26 extends between the bins 4 at the common boundary, the sheet 26 being displaceable by the tractor driver to a desired latched position, the tractor driver manually moving a handle 27.

Referring now to FIG. 9, the trailer supply bin 8 comprises a bin formed from side walls 28, a floor 29, a rear wall 30 and an outwardly inclined front wall 31 mounted on a supporting frame 32. At the rear of the frame 32, a single land wheel 33 is provided in a centrally disposed position, the plane of the wheel being pivotally displaceable about a vertical mounting bolt 34.

Billet supply means in the form of a conveyor 35 is provided in association with the front wall 31, the conveyor 35 comprising upper and lower sprocket wheels 36 at each side of the front wall 31 with chains 37 passing over the sprocket wheels 36. A series of ribs 38 extend laterally between the chains 36 such that when the ribs are moved upwardly in the direction of arrow A to pick up sugar cane billets, a lip on the outer edge of each rib extends upwardly thereby defining a billet receiving pocket.

The drawing schematically illustrates the conveyor but in a practical embodiment it may be convenient to locate the chains 37 such that the ribs have inner edges which, during their upward motion, move adjacent the inner face of the front wall 31.

As the ribs 38 pass over the upper sprocket wheels 36, the entrained billets fall into a storage bin 4 of the planting machine 39 schematically illustrated in chain-dotted lines. The planting machine is as shown in FIGS. 2–8, and is supported and mounted on the rear of a tractor through the 3-point linkage 6. The apparatus is towed behind the tractor, the frame 32 being connected to the planting machine 39 through a pivotal linkage 40 such that the bin can pivot about a horizontal axis extending laterally relative to the planting machine 39. By the use of conventional hydraulic controls, the planting machine 39 can be upwardly and downwardly displaced between planting and retracted positions. In the retracted position, the bottom of the planting machine is clear of the ground so as to permit movement of the machine between planting areas. When the planting machine 39 is lowered to the planting position, it will be seen that the point at which the conveyor 35 delivers the billets is immediately above the storage bins 4.

The floor 29 and the rear wall 30 of the bin are rigidly fixed to one another, but the front edge of the floor 29 is pivotally connected to the rest of the trailer bin, so that by operation of a hydraulic ram 41, the floor and rear wall can be displaced. FIG. 9 illustrates the floor and rear wall displaced to an elevated position; this position is selected when only a small quantity of billets remain in the bin for planting; the inclined angle of the floor 29 and the rear wall 30 causing the billets to slide down to the base of the supply conveyor 35. In this way a large quantity of billets can be initially loaded into the bin with the floor and rear wall in a lowered position.

We claim:

1. Sugar cane planting apparatus comprising walls and a floor defining a billet-receiving bin, means for mounting the apparatus so that it is supported for movement across a field and along a planting path, billet supply conveyor means having a series of supply elements displacably mounted for movement in sequence through said bin for taking up billets from a mass of billets stored in the bin and moving these billets to a discharge point which is elevated relative to the floor of the bin, means for guiding and controlling the descent of the billets from the discharge point to a planting station disposed generally below the discharge point, the guide means having means for orientating the billets so that on release of a billet at the planting station its longitudinal direction extends substantially parallel to the planting path, the conveyor means comprises an endless moveable member having a forward run extending from the bin towards said discharge point and a return run extending downwardly to said planting station, said supply elements being mounted at spaced intervals on said moveable member, each supply element having a trough-like recess extending transverse to the direction of displacement thereof and dimensioned for accommodating one billet whereby as the supply elements are moved through said bin, a billet tends to be gathered in each trough-like recess, surplus billets tending to ball back into said bin, the moveable member comprising a pair of parallel spaced chains adapted to be driven over respective sprocket wheels, the supply elements being mounted at respective ends to the chains, a wall extending immediately behind said forward run, the planting station is below the bottom end of the return run, the conveyor means being adapted to be mounted with each conveyor element being inverted during transition from the forward run to the return run, whereby the billet mounted therein falls onto the upturned reverse side of the preceding supply element and is thereby lowered to be dropped and delivered to the planting station at the bottom of the return run, each conveyor element having the width and depth of its recess dimensioned such that more than one billet may be taken up and initially conveyed in the recess, the return run extending backwardly at an acute angle to the vertical direction and having a casing surrounding at least a portion of the return run, the reverse side of each supply element having a lip extending along its edge remote from the forward run such that only one of the billets received on the reverse side of a conveyor element is retained, the casing having an aperture arranged such that any billet in excess of the billet retained by the lip is maintained upstream of the aperture in a supported condition on the supply element by the casing, which is closely adjacent the lip of each supply element, and any excess billet rolls out through the aperture.

2. Apparatus as claimed in claim 1, wherein the forward run and the reverse run are parallel and both extend at about 15° to the vertical, the reverse run being angled backwardly.

3. Apparatus as claimed in claim 1, wherein the aperture is located in the casing at a position normally above the bin, and a chute is provided for conveying any excess billet back to the bin.

4. Sugar cane planting apparatus comprising walls and a floor defining a billet-receiving bin, means for mounting the apparatus so that it is supported for movement across a field and along a planting path, billet supply conveyor means having a series of supply elements displacably mounted for movement in sequence through said bin for taking up billets from a mass of billets stored in the bin and moving these billets to a discharge point which is elevated relative to the floor of the bin, means for guiding and controlling the descent of the billets from the discharge point to a planting station disposed generally below the discharge point, the guide means having means for orienting the billets so that on release of a billet at the planting station its longitudinal direction extends substantially parallel to the planting path, the conveyor means comprises an endless moveable member having a forward run extending from the bin towards said discharge point and a return run extending downwardly to said planting station, said supply elements being mounted at spaced intervals on said moveable member, each supply element having a trough-like recess extending transverse to the direction of displacement thereof and dimensioned for accommodating one billet whereby as the supply elements are moved through said bin, a billet tends to be gathered in each trough-like recess, surplus billets tending to fall back into said bin, the recess in each supply element being dimensioned for taking up at least one end preferably a plurality of billets, at least one of which tends to lay in the trough-like recess, and ejection means displaceable in a direction transverse to the movement of the supply elements provided at a location normally above the bin for ejecting any surplus billet not lying in said recess whereby the ejected billet falls back into the container means.

5. Apparatus as claimed in claim 4, wherein the ejection means comprises a pivotal plate mounted in a wall extending adjacent and on the return run side of the forward run, the pivotal plate extending downstream from a transverse pivotal mounting, the plate being spring biased to an outwardly extending position for engaging and ejecting a surplus billet and being displaceable by engagement with a conveyor element to a position substantially flush with said wall as the conveyor element passes the plate.

* * * * *